United States Patent
Stuart et al.

(10) Patent No.: US 12,518,873 B2
(45) Date of Patent: *Jan. 6, 2026

(54) REMOTE PRESENCE SYSTEM INCLUDING A CART THAT SUPPORTS A ROBOT FACE AND AN OVERHEAD CAMERA

(71) Applicant: TELADOC HEALTH, INC., Purchase, NY (US)

(72) Inventors: David Stuart, Santa Barbara, CA (US); Daniel Steven Sanchez, Goleta, CA (US); Fuji Lai, Goleta, CA (US); Kevin Hanrahan, Santa Barbara, CA (US); Charles S. Jordan, Santa Barbara, CA (US); David Roe, Santa Barbara, CA (US); James Rosenthal, Santa Barbara, CA (US); Amante Mangaser, Goleta, CA (US); Blair Whitney, Santa Barbara, CA (US); Derek Walters, Campbell, CA (US)

(73) Assignee: TELADOC HEALTH, INC., New York, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 18/492,159

(22) Filed: Oct. 23, 2023

(65) Prior Publication Data
US 2024/0312622 A1    Sep. 19, 2024

Related U.S. Application Data

(63) Continuation of application No. 17/095,371, filed on Nov. 11, 2020, now Pat. No. 11,798,683, which is a (Continued)

(51) Int. Cl.
*G16H 40/67* (2018.01)
*B25J 9/16* (2006.01)
(Continued)

(52) U.S. Cl.
CPC ............ *G16H 40/67* (2018.01); *B25J 9/1689* (2013.01); *B25J 9/1697* (2013.01); *G16H 30/20* (2018.01);
(Continued)

(58) Field of Classification Search
CPC ........ G16H 40/67; G16H 30/20; G16H 30/00; G16H 40/40; B25J 9/1689; B25J 9/1697;
(Continued)

(56) References Cited

U.S. PATENT DOCUMENTS

| 5,130,794 A | * | 7/1992 | Ritchey | H04N 13/38 348/E13.052 |
| 5,495,576 A | * | 2/1996 | Ritchey | H04N 13/344 348/E13.058 |
| 5,572,248 A | * | 11/1996 | Allen | H04N 7/142 348/E7.083 |

* cited by examiner

*Primary Examiner* — Jaime Figueroa (57) ABSTRACT

A tele-presence system that includes a cart. The cart includes a robot face that has a robot monitor, a robot camera, a robot speaker, a robot microphone, and an overhead camera. The system also includes a remote station that is coupled to the robot face and the overhead camera. The remote station includes a station monitor, a station camera, a station speaker and a station microphone. The remote station can display video images captured by the robot camera and/or overhead camera. By way of example, the cart can be used in an operating room, wherein the overhead camera can be placed in a sterile field and the robot face can be used in a non-sterile field. The user at the remote station can conduct a teleconference through the robot face and also obtain a view of a medical procedure through the overhead camera.

20 Claims, 5 Drawing Sheets

Related U.S. Application Data continuation of application No. 15/464,164, filed on Mar. 20, 2017, now Pat. No. 10,887,545, which is a continuation of application No. 14/743,733, filed on Jun. 18, 2015, now Pat. No. 9,600,631, which is a continuation of application No. 14/157,470, filed on Jan. 16, 2014, now Pat. No. 9,089,972, which is a continuation of application No. 12/717,806, filed on Mar. 4, 2010, now Pat. No. 8,670,017.

(51) Int. Cl.
*G16H 30/20* (2018.01)
*H04L 65/403* (2022.01)
*H04L 67/10* (2022.01)
*H04N 5/265* (2006.01)
*H04N 7/14* (2006.01)
*H04N 7/18* (2006.01)
*H04N 23/60* (2023.01)
*H04N 23/63* (2023.01)
*H04N 23/66* (2023.01)
*H04N 23/661* (2023.01)
*H04N 23/90* (2023.01)

(52) U.S. Cl.
CPC ............ *H04L 65/403* (2013.01); *H04L 67/10* (2013.01); *H04N 5/265* (2013.01); *H04N 7/142* (2013.01); *H04N 7/185* (2013.01); *H04N 23/631* (2023.01); *H04N 23/64* (2023.01); *H04N 23/66* (2023.01); *H04N 23/661* (2023.01); *H04N 23/90* (2023.01); *H04N 23/635* (2023.01)

(58) Field of Classification Search
CPC ....... H04L 65/403; H04L 67/10; H04N 5/265; H04N 7/142; H04N 7/185; H04N 23/631; H04N 23/64; H04N 23/66; H04N 23/661; H04N 23/90; H04N 23/635
USPC ................. 700/245–264; 318/568.11–568.25
See application file for complete search history.

REMOTE PRESENCE SYSTEM INCLUDING A CART THAT SUPPORTS A ROBOT FACE AND AN OVERHEAD CAMERA

BACKGROUND OF THE INVENTION

1. Field of the Invention

The subject matter disclosed generally relates to the field of robotic tele-presence systems.

2. Background Information

Robots have been used in a variety of applications ranging from remote control of hazardous material to assisting in the performance of surgery. For example, U.S. Pat. No. 5,762,458 issued to Wang et al. discloses a system that allows a surgeon to perform minimally invasive medical procedures through the use of robotically controlled instruments. One of the robotic arms in the Wang system moves an endoscope that has a camera. The camera allows a surgeon to view a surgical area of a patient.

There has been marketed a mobile tele-presence robot introduced by InTouch Technologies, Inc., the assignee of this application, under the trademark RP-7. The InTouch robot is controlled by a user at a remote station. The remote station may be a personal computer with a joystick that allows the user to remotely control the movement of the robot. Both the robot and remote station have cameras, monitors, speakers and microphones to allow for two-way video/audio communication. The robot camera provides video images to a screen at the remote station so that the user can view the robot's surroundings and move the robot accordingly.

InTouch also provides a system sold as VisitOR that includes a robot face that is attached to a boom. The boom and robot face can be installed into an operating room. Using a robot face in an operating room may require sterilization of the face. Additionally, the VisitOR requires the installation of a boom in the operating room. This can add to the cost and complexity of installing such a system.

BRIEF SUMMARY OF THE INVENTION

A tele-presence system that includes a cart. The cart includes a robot face that has a robot monitor, a robot camera, a robot speaker, a robot microphone, and an overhead camera. The system also includes a remote station that is coupled to the robot face and the overhead camera. The remote station includes a station monitor, a station camera, a station speaker and a station microphone.

DETAILED DESCRIPTION

Disclosed is a tele-presence system that includes a cart. The cart includes a robot face that has a robot monitor, a robot camera, a robot speaker, a robot microphone, and an overhead camera. The system also includes a remote station that is coupled to the robot face and the overhead camera. The remote station includes a station monitor, a station camera, a station speaker and a station microphone. The remote station can display video images captured by the robot camera and/or overhead camera. By way of example, the cart can be used in an operating room, wherein the overhead camera can be placed above a sterile field to provide a more advantageous vantage point to view a procedure. The user at the remote station can conduct a teleconference through the robot face and also obtain a view of a medical procedure through the overhead camera.

Figure 1:
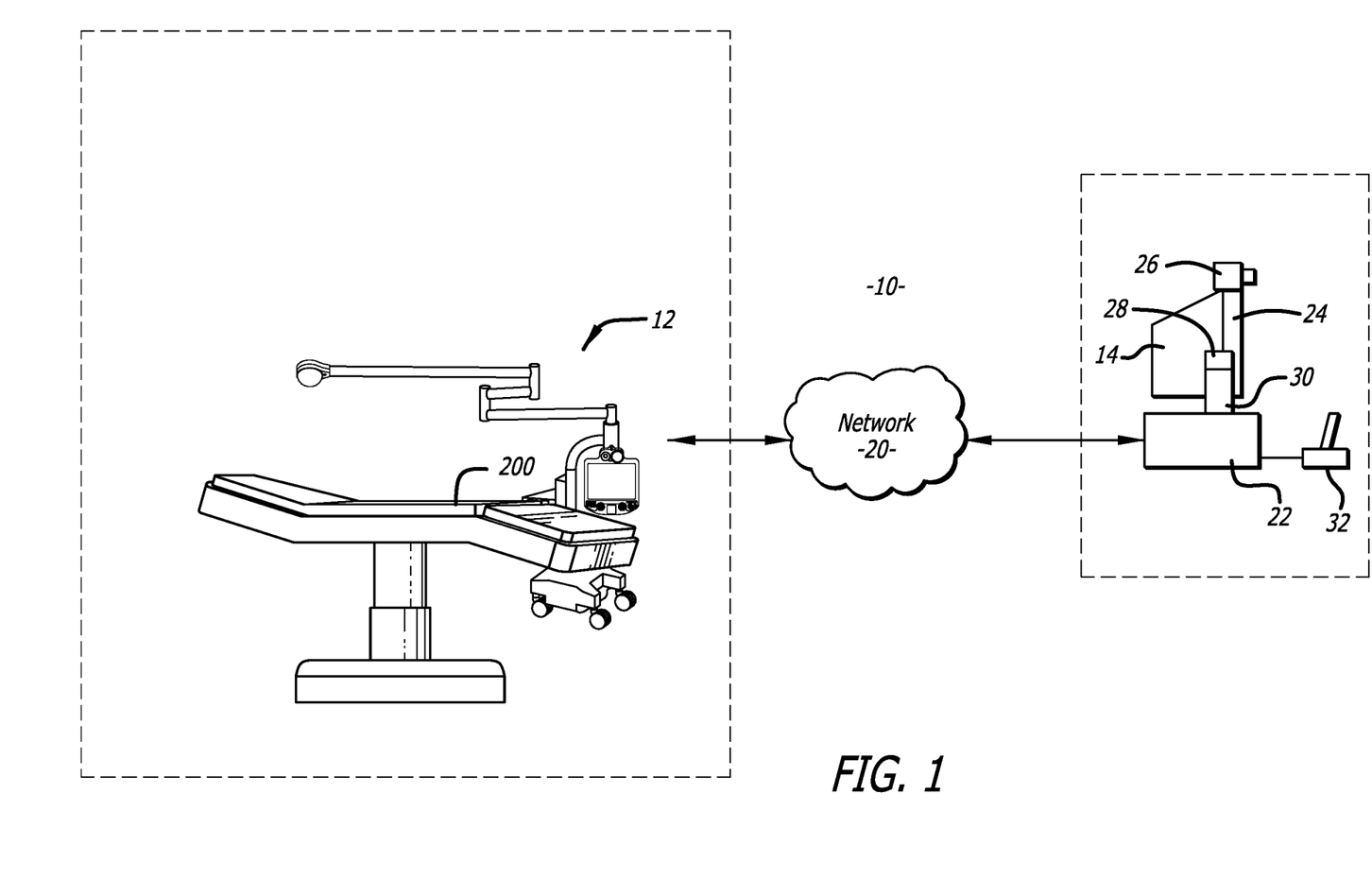
FIG. 1 is an illustration of a tele-presence system.
Figure 2:
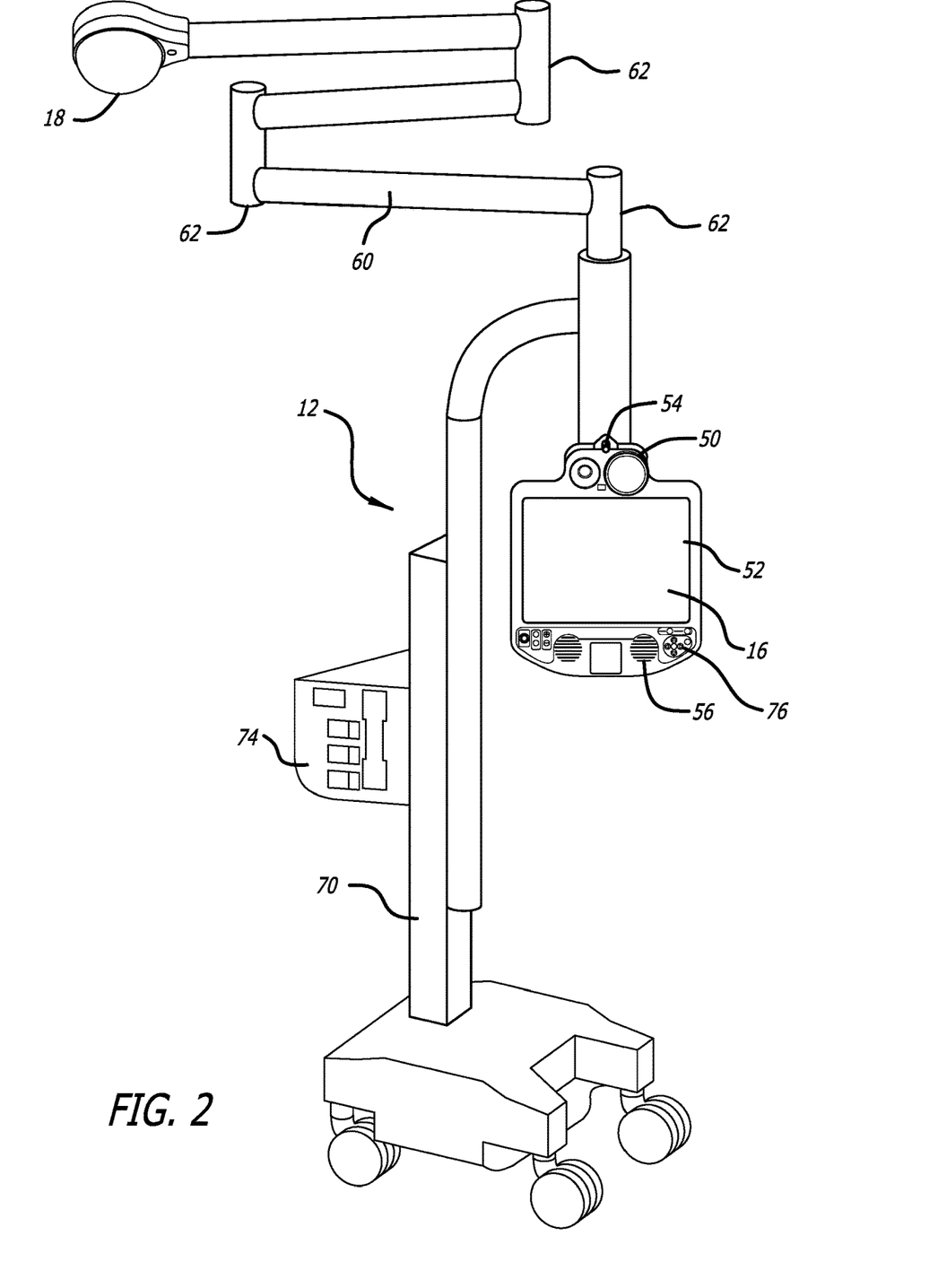
FIG. 2 is a perspective view of a cart of the system.
Figure 3:
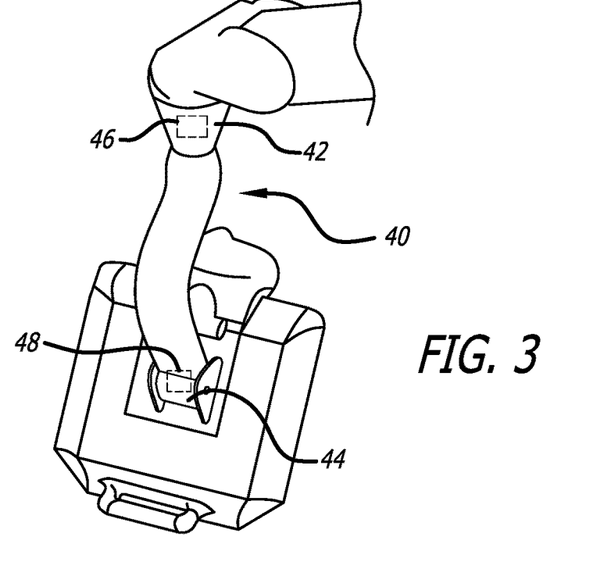
FIG. 3 is a rear view of an articulated arm and a robot face of the cart.

Referring to the drawings more particularly by reference numbers, FIGS. 1, 2 and 3 show a tele-presence system 10. The system 10 includes a cart 12 that is coupled to a remote control station 14. The cart 12 has a robot face 16 and an overhead camera 18. The remote control station 14 may be coupled to the cart 12 through a network 20. By way of example, the network 20 may be either a packet switched network such as the Internet, or a circuit switched network such as a Public Switched Telephone Network (PSTN) or other broadband system. Alternatively, the cart 12 may be coupled to the remote station 14 network thru a satellite.

The remote control station 14 may include a computer 22 that has a monitor 24, a camera 26, a microphone 28 and a speaker 30. The computer 22 may also contain an input device 32 such as a joystick or a mouse. The control station 14 is typically located in a place that is remote from the cart 12. Although only one remote control station 14 is shown, the system 10 may include a plurality of remote stations 14. In general any number of carts 12 may be coupled to any number of remote stations 14 or other carts 12. For example, one remote station 14 may be coupled to a plurality of carts 12, or one cart 12 may be coupled to a plurality of remote stations 14, or a plurality of carts 12. The system may include an arbitrator (not shown) that control access between the carts 12 and the remote stations 14.

As shown in FIG. 3, the cart 12 may include an articulated arm 40 that supports and can move the robot face 16. The articulated arm 40 may have active joints 42 and 44 that allow the robot face 14 to be panned and tilted, respectively. The active joints 42 and 44 may move in response to commands provided by the remote station. The joints 42 and 44 may contain position sensors 46 and 48, respectively, that provide positional feedback of the arm 40.

Referring to FIGS. 2 and 3, each robot face 16 includes a camera(s) 50, a monitor 52, a microphone(s) 54 and a speaker(s) 56. The robot camera 50 is coupled to the remote monitor 24 so that a user at the remote station 14 can view a video image captured by the robot camera 50. Likewise, the robot monitor 52 is coupled to the remote camera 26 so personnel at the surgical site may view the user of the remote station 14. The microphones 28 and 54, and speakers 30 and 56, allow for audible communication between the system operator and the personnel at the surgical site.

The overhead camera 18 may be coupled to a boom 60. The boom 60 may include a number of joints 62, either active or passive. The joints 62 may include positional sensors to provide feedback regarding the position of the overhead camera 18.

Figure 4:
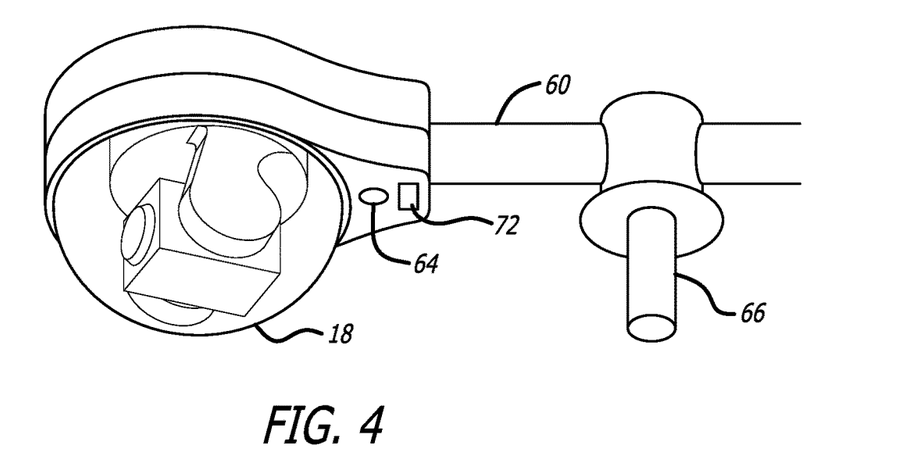
FIG. 4 is an enlarged perspective view of an overhead camera of the cart.

As shown in FIG. 4, the cart 12 may include an overhead microphone 64 and a detachable handle 66. The overhead microphone 64 may provide an alternative source of sound. The detachable handle 66 can be used to move the boom 60 and overhead camera 18. If the cart 12 is used in a sterile field, for example in an operating room, the handle 66 may be replaced with a sterile handle before each medical procedure to allow a surgeon within the sterile field to position the boom during a procedure.

Referring again to FIG. 2, the cart 12 may include a linear actuator 70 that can be remotely or locally actuated to vary the height of the robot face 16 and overhead camera 18. Varying the height allows the cart 12 to be rolled through doors and then actuated to move the face 16 and camera 18 to elevated positions. For example, the face 16 and camera 18 can be lowered to allow the cart 12 to be moved into an operating room. The camera 18 can then be raised to provide a desirable view over an operating table. The cart 12 may include a laser pointer 72 and/or directed lighting (not shown) located on the boom 60. The cart 12 may also include a local control panel 74 to move the articulated arm 40, actuator 70 and/or boom 60. The linear actuator 70 is also advantageous in moving the face 16 to be essentially at the same level as a person whether they are standing, sitting or lying in a prone position.

The robot face 16 may include a processor, hard disk drive and other circuits that enable the face 16 to function as a computer. The face 16 may include an input panel 76 that allows a user to provide input. By way of example, the operator of the remote station may provide one or more questions through the robot face 16, wherein a user of the cart provides answers through the input panel 76.

The system 10 may have certain components and software that are the same or similar to a robotic system provided by the assignee InTouch Technologies, Inc. of Goleta, California under the name RP-7 and embodies a system described in U.S. Pat. No. 6,925,357, which is hereby incorporated by reference.

Figure 5:
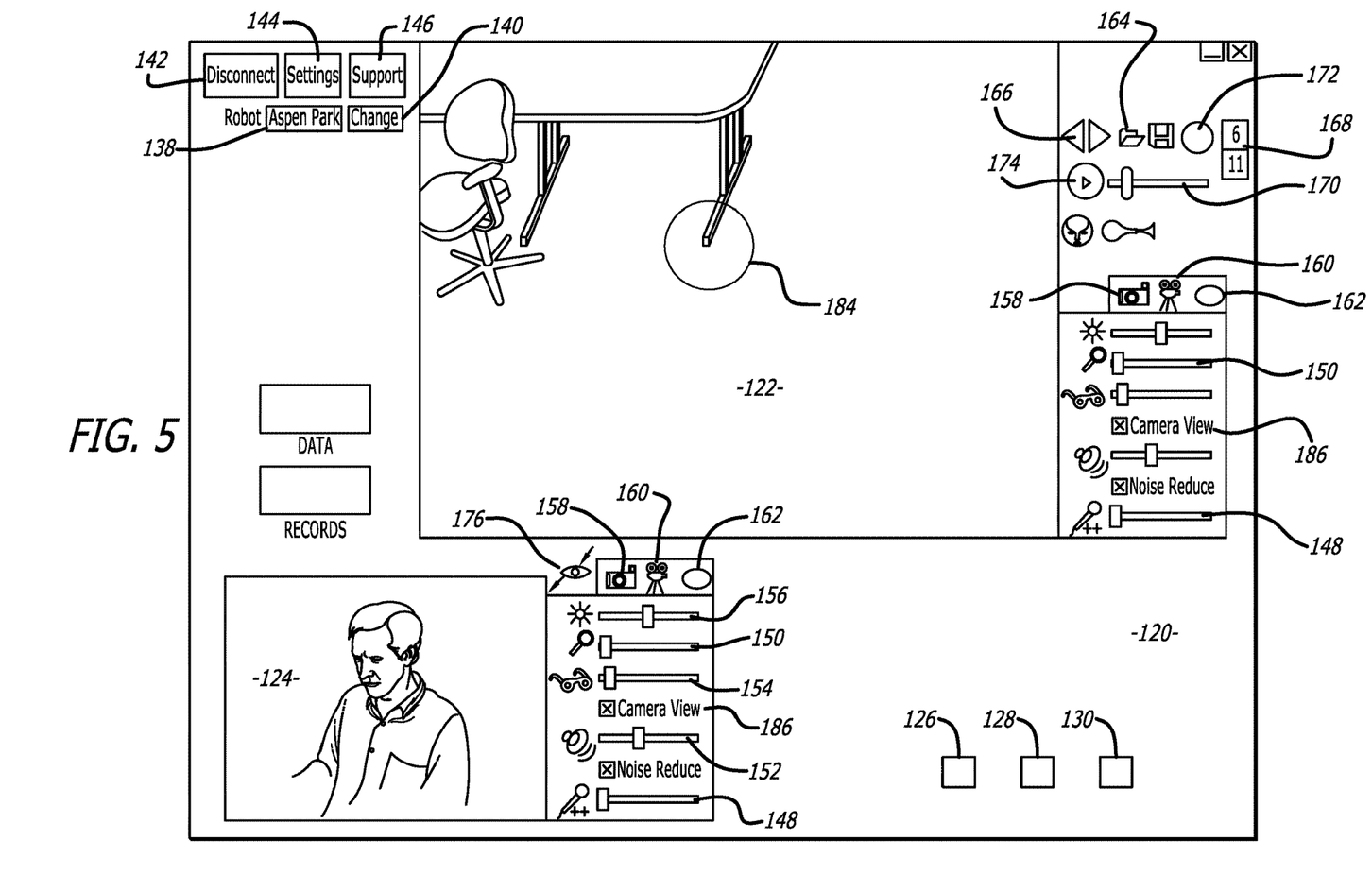
FIG. 5 is an illustration of a display user interface of a remote station.

FIG. 5 shows a display user interface ("DUI") 120 that can be displayed at the remote station 14. The DUI 120 may include a robot view field 122 that displays a video image captured by the robot camera and/or the overhead camera. The DUI 120 may also include a station view field 124 that displays a video image provided by the camera of the remote station 14. The DUI 120 may be part of an application program stored and operated by the computer 22 of the remote station 14.

Figure 6:
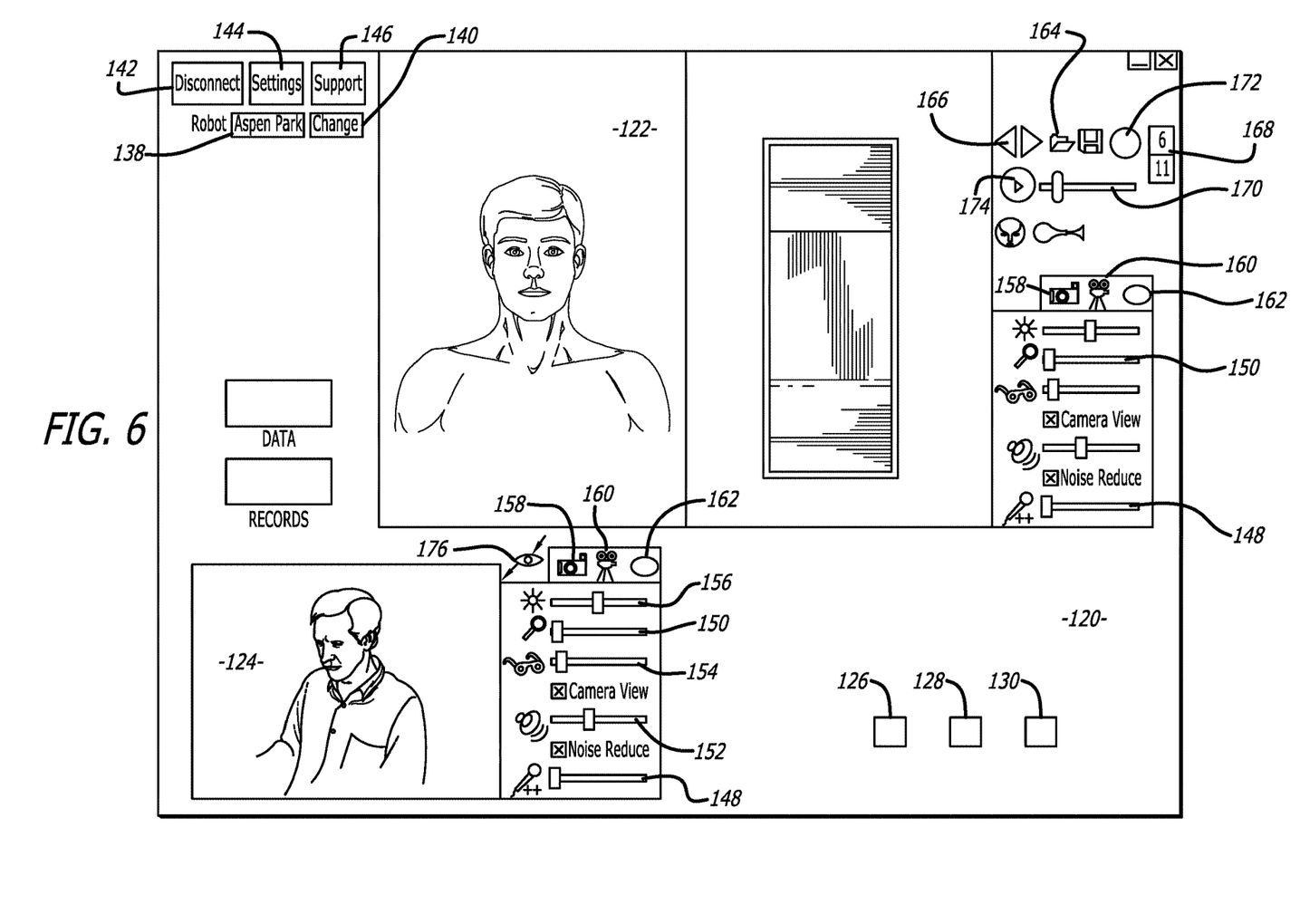
FIG. 6 is an illustration of the display user interface showing video images captured by a robot camera and an overhead camera being simultaneously displayed.

The DUI 120 may include a graphical switch 126 that allows the user to select between the video image provided by the robot camera and the video image provided by the overhead camera. The DUI 120 may also have a graphical switch 128 that allows the user to select the simultaneous display of the video images from the robot and overhead cameras as shown in FIG. 6. The video images from both cameras can be streamed to the remote station from the cart. The images can be merged by presenting a center rectangle of each image (e.g., 320×480 center area). A zoom or highlighting feature may be utilized by manipulating a cursor on either image. The system may also automatically pan a camera when the cursor is moved out of the displayed field of view.

The system may automatically present the video image from a camera that has an optimal view of an object. For example, the system may utilize pattern recognition techniques to determine which video image provides a more clear image of an object. The system may determine which camera is in closer proximity to an object and provide the image from the camera that is closer to the object. The system may utilize positional feedback from the cart to determine the proximity of the cameras relative to the object. The system may also have sensors, such as laser, sonar, etc. that can determine the proximity of the cameras to the object. The system may use the feedback and/or sensors to determine which camera is closer to an object.

The system may automatically move the cameras so that each camera is pointed to the same or substantially the same field of view. For example, if the robot face is pointed toward an object, the overhead camera can be automatically moved to capture a video image of the same object. Likewise, if the overhead camera is capturing a video image of an object, the robot face can be automatically moved to point toward the same object. This enhances the "presence" of the remote operator because they are facing the same object that the overhead camera is viewing.

The DUI 120 may have a graphical switch 130 that allows the user to switch between sound captured by the robot microphone or the overhead microphone. The system may automatically switch between microphones based on a characteristic(s) of the sound captured by the microphones. For example, the system may switch to the microphone that provides the highest aural clarity, or to the microphone that is in the closest proximity to a person or object generating the sound.

The DUI 120 may include a location display 138 that provides the location of the robot face. The CHANGE button 140 can be selected to change the default robot face in a new session. The CHANGE button 140 can be used to select and control a different robot face in a system that has multiple robot faces. The user can initiate and terminate a session by selecting box 142. The box 142 changes from CONNECT to DISCONNECT when the user selects the box to initiate a session. System settings and support can be selected through buttons 144 and 146.

Both the robot view field 122 and the station view field 124 may have associated graphics to vary the video and audio displays. Each field may have an associated graphical audio slide bar 148 to vary the audio level of a selected microphone and another slide bar 152 to vary the volume of the speakers.

The DUI 120 may have slide bars 150, 154 and 156 to vary the zoom, focus and brightness of a selected camera, respectively. A still picture may be taken at either the robot face or remote station by selecting one of the graphical camera icons 158. The still picture may be the image presented at the corresponding field 122 or 124 at the time the camera icon 158 is selected. Capturing and playing back video can be taken through graphical icons 160. A return to real time video can be resumed, after the taking of a still picture, captured video, or reviewing a slide show, by selecting a graphical LIVE button 162.

A still picture can be loaded from disk for viewing through selection of icon 164. Stored still images can be reviewed by selecting buttons 166. The number of the image displayed relative to the total number of images is shown by graphical boxes 168. The user can rapidly move through the still images in a slide show fashion or move through a captured video clip by moving the slide bar 170. A captured video image can be paused through the selection of circle 174. Play can be resumed through the same button 174. Video or still images may be dismissed from the active list through button 172. Video or still images may be transferred to the robot by selecting icon 176. For example, a doctor at the remote station may transfer an x-ray to the screen of the robot.

The system may provide the ability to annotate 184 the image displayed in field 122 and/or 124. For example, a doctor at the remote station may annotate some portion of the image captured by the robot face camera. The annotated image may be stored by the system. The system may also allow for annotation of images sent to the robot face through icon 176. For example, a doctor may send an x-ray to the robot face which is displayed by the robot screen. The doctor can annotate the x-ray to point out a portion of the x-ray to personnel located at the robot site. This can assist in allowing the doctor to instruct personnel at the robot site.

The display user interface may include graphical inputs 186 that allow the operator to turn the views of the remote station and remote cameras on and off.

Referring to FIG. 1, the cart 12 can be used in an operating room. By way of example, the boom 60 can be moved to place the overhead camera 18 above an operating table 200. The overhead camera 18 may be located above a sterile field. The robot face 16 may be placed adjacent to the sterile field. With such a configuration, personnel may conduct two-way video conferencing through the robot face 16. The overhead camera 18 may provide a more desirable view of the patient and operating procedure. This would allow a physician at the remote station to view the procedure and have a video conference to provide instructions, mentoring, etc. to personnel at the surgical site.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A surgical mentoring system comprising:
   a cart including:
   a first camera;
   a second camera;
   a speaker;
   a microphone; and
   an input device, wherein
   the second camera is coupled to the cart via a boom that includes one or more joints configured to allow a distance between a first end of the boom and a second end of the boom to be varied,
   the cart is configured to be coupled to a remote station via a network, the remote station including a camera, a monitor, a microphone, and a speaker, wherein the remote station is configured to display a user interface on the remote station monitor, the user interface includes a remote view field, a remote station view field, and a plurality of graphical controls,
   the plurality of graphical controls includes two or more of a control to selectively display video from the first camera or the second camera, a control to display a still image captured by the first camera or the second camera in the remote view field, a control to selectively display an image captured by the remote station camera on the cart monitor, and a control allowing a user of the remote station to annotate an image displayed on the cart monitor from the remote station,
   the station view field displays an image captured by the station camera, the station speaker reproduces a sound captured by the cart microphone, the station microphone captures a sound that is transmitted to and reproduced by the cart speaker, and
   the orientation of at least one of the first camera and the second camera is independently controlled via an input device of the remote station.

2. The system of claim 1, wherein the two or more controls includes a switch that allows the user to select simultaneous display of video images from the first and second cameras.

3. The system of claim 1, wherein the video images from both the first camera and the second camera are streamed to the remote station from the cart.

4. The system of claim 1, wherein a height of the first camera is less than a height of the second camera.

5. The system of claim 1, wherein the boom includes a handle that is used to move the second camera.

6. The system of claim 1, wherein the cart includes a processor and a hard drive.

7. The system of claim 1, wherein cart includes an input panel that allows a user to provide input.

8. The system of claim 7, wherein the user interface includes a location display that provides the location of the cart.

9. The system of claim 7, wherein the system includes a plurality of carts and the user interface includes a graphical input that is used to select and control a second cart.

10. The system of claim 1, wherein said cart includes a second microphone.

11. The system of claim 1, wherein the one or more controls includes a control that allows a user to switch between the first microphone and the second microphone.

12. A method for surgical mentoring, comprising:
    displaying a user interface on a monitor of a remote station, the user interface including a remote view field, a station view field, and a plurality of graphical controls;
    establishing a communication session with a cart in proximity to a surgical field, the cart including a first camera, a second camera, a monitor, a microphone, a speaker, and an input device, wherein the second camera is coupled to the cart via a boom that includes one or more joints configured to allow a distance between a first end of the boom and a second end of the boom to be varied;
    displaying, in the station view field, an image captured by the station camera on the station monitor;
    reproducing, by the station speaker, a sound captured by the cart microphone;
    capturing, by the station microphone, a sound that is transmitted to and reproduced by the cart speaker; and
    controlling the orientation of at least one of the first camera and the second camera from the remote station, wherein the plurality of graphical controls includes controls for two or more of selectively displaying video from the first camera or the second camera in the remote view field in response to user input at the remote station, displaying a still image captured by one of the first camera or the second camera in the remote view field in response to user input at the remote station, selectively display an image captured by the remote station camera on the cart monitor, and annotating an image displayed on the cart monitor in response to user input at the remote station.

13. The method of claim 12, further comprising simultaneously displaying video images from the first and second cameras at the remote station.

14. The method of claim 13, further comprising receiving at the remote station video streams from both the first and second cameras.

15. The method of claim 13, further comprising receiving input from an input panel of the cart at the remote station.

16. The method of claim 13, further comprising displaying a location display at the remote station that provides the location of the cart.

17. The method of claim 13, further comprising displaying at the remote station a graphical input that is selected to select and control a second cart.

18. The method of claim 13, further comprising controlling the zoom of the first camera from the remote station in response to user input.

19. The method of claim 13, further comprising controlling the zoom of the second camera from the remote station in response to user input.

20. A non-transitory computer-readable medium comprising program code that, when executed by one or more processors, causes the one or more processors to perform a method for automated health condition scoring, the method comprising:

displaying a user interface on a monitor of a remote station, the user interface including a remote view field, a station view field, and a plurality of graphical controls;

establishing a communication session with a cart in proximity to a surgical field, the cart including a first camera, a second camera, a monitor, a microphone, a speaker, and an input device, wherein the second camera is coupled to the cart via a boom that includes one or more joints configured to allow a distance between a first end of the boom and a second end of the boom to be varied;

displaying, in the station view field, an image captured by the station camera on the station monitor;

reproducing, by the station speaker, a sound captured by the cart microphone;

capturing, by the station microphone, a sound that is transmitted to and reproduced by the cart speaker; and controlling the orientation of at least one of the first camera and the second camera from the remote station, wherein the plurality of graphical controls includes controls for two or more of selectively displaying video from the first camera or the second camera in the remote view field in response to user input at the remote station, displaying a still image captured by one of the first camera or the second camera in the remote view field in response to user input at the remote station, selectively display an image captured by the remote station camera on the cart monitor, and annotating an image displayed on the cart monitor in response to user input at the remote station.

* * * * *